United States Patent Office 2,856,594
Patented Oct. 14, 1958

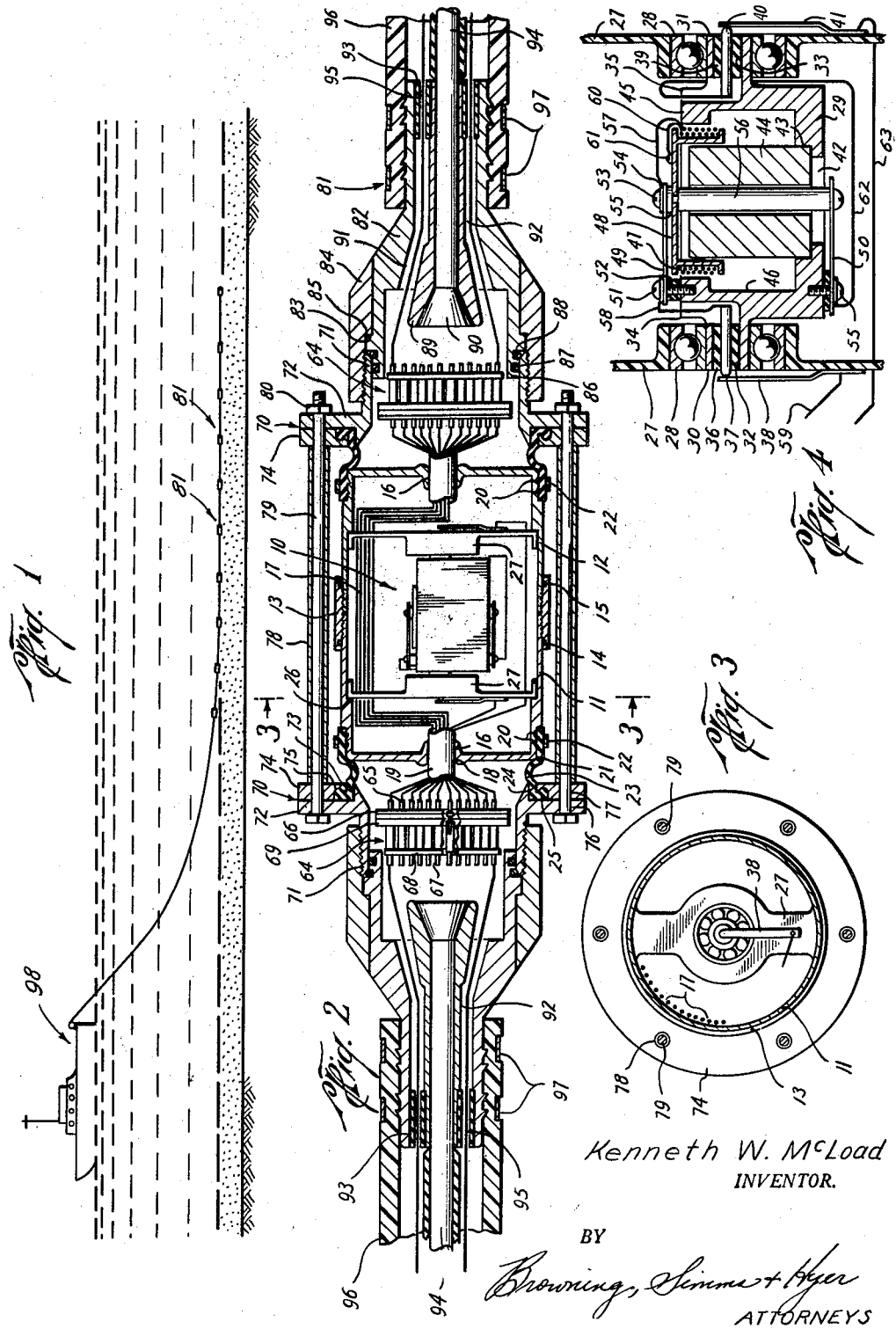

2,856,594

SEISMIC DETECTOR

Kenneth W. McLoad, Houston, Tex., assignor to Vector Manufacturing Company, Houston, Tex., a partnership Application March 4, 1955, Serial No. 492,109

11 Claims. (Cl. 340—17)

This invention relates to a detector for seismic prospecting and, more particularly, to a detector of the type which generates a signal in response to bodily movement of the detector, for use in marsh land, water-covered areas and the like, particularly those water-covered areas having an excessively soft or silt-laden bottom.

In marine seismic exploration the cable through which signals are fed to the recording equipment is usually sectionalized. Seismic detectors are commonly incorporated in the cable at junctions between sections of the cable. The detectors actually form a part of the cable and are electrically connected to conductors within the cable which lead to the recording equipment in the towing boat. Cables thus constructed are satisfactory when resting upon firm bottom to receive the seismic waves. The result, however, is not satisfactory where the detectors are suspended in water or rest upon an excessively soft or silt-laden bottom as their density is much greater than the density of water. A detector of the usual type has a density between 6 and 8 times the density of water. This difference in density will cause the particle motion of the water to tend to flow around the detector with detrimental results to the recorded data, which is thereby rendered much less useful and accurate than data recorded on a hard bottom such as packed sand or shell.

Silt-laden bottom has in many instances a density approximating the density of water and hence movement of the silt will tend to be about the detector as in the case of water and the readings obtained are not as accurate as those obtained on a hard bottom.

It has been recognized in the past that this problem might be solved by constructing a detector and all parts rigidly attached thereto with a density approximating the density of the water, under which condition the detector will be actuated by the seismic waves with much greater fidelity. The prior art solutions to the problem have usually obtained accurate recordings but each solution has involved severe disadvantages from a practical operational standpoint.

One solution to the problem is to provide detectors which are rigidly attached to the cable but are greatly enlarged in size to obtain the volume necessary to provide a detector having a density approximating that of water. The enlarged detectors are very bulky and fragile. They are readily abraded or otherwise damaged by the ocean bottom. Due to their size they interfere with the storage of the cable on a reel aboard the towing boat.

Another solution is to employ buoys which are rigidly attached to the detectors to cause the detectors to move with water particle movement. The buoys are very bulky and fragile and are often lost when the cable is towed across bottom obstructions. They also interfere with storage of the cable on a reel aboard a boat.

Another solution provided in the past involved the provision of a detector which was separate from the cable and connected thereto by small resilient leads. In this instance, the detectors may have a density approximating the density of water or they may be attached to floats which will support the detectors. The floating or separately buoyed detectors are unsatisfactory as the small leads by which they are attached to the main cable tend to break as the cable is towed between shots and also to wrap around the main cable until the lead becomes so short that the detector cannot move independent of the cable. They also interfere with storage of the cable on a reel aboard a boat.

It is an object of this invention to provide a detector of the type which generates a signal in response to movement of the detector for use in seismic exploration in areas where the detector cannot rest upon firm ground which eliminates the foregoing deficiencies.

Another object is to provide a detector of the type which forms a part of the cable and generates a signal in response to movement of the detector which will give an accurate signal when suspended in water or resting on soft bottom without materially increasing the size of the detector or using buoys or the like.

Another object is to provide a detector which combines the accuracy of a detector which is separate from the main cable except for a resilient lead with the operational advantages of the small heavy detector which interconnects two sections of cable.

Another object is to provide a detector of the type which forms a part of the cable and generates a signal in response to movement of the detector in which a cage surrounds the signal generating portion of the detector and protects it from damage.

Another object is to provide a detector of the type interconnects two sections of cable in which the active or current generating portion of the detector is of approximately the same density as water, together with means for coupling the active portion of the detector to the remainder of the detector which for structural reasons cannot be the density of the medium of immersion, the coupling means permitting relative movement between the active portion and the remainder of the detector.

Other objects, features and advantages of the invention will be apparent to one skilled in the art from a consideration of the drawing, specification and claims.

In the drawing wherein there is shown an illustrative embodiment of this invention and wherein like reference numerals indicate like parts:

Fig. 1 is a diagrammatic view of a cable constructed in accordance with this invention resting upon a soft bottom or layer of silt and extending to a recording boat on the surface of the water;

Fig. 2 is a view in vertical cross section through a detector constructed in accordance with this invention with the signal generator shown in elevation;

Fig. 3 is a view along the lines 3—3 of Fig. 2 in the direction of the arrows; and Fig. 4 is a view in vertical cross section on a slightly enlarged scale through the signal generator and mounting therefor.

The detector of this invention may be considered as having an active or signal generating portion and an inactive portion. The signal generating portion may have an electromagnetic device such as the relatively movable coil of wire and magnetic member illustrated in Fig. 4 to generate a signal. The non-active portion of the detector includes spaced coupling members for coupling the detector between sections of seismic cable and means for interconnecting these coupling members and transmitting stress therebetween. The generator is contained within a tubular case which is supported between the cable couplings for vibratory movement by tubular sleeves of resilient material which additionally seal the detector to prevent entry of fluid into the interior of the detector. It will be appreciated that a force as high as from 2,000 to 10,000 pounds is sometimes necessary to drag the cable between shot points and hence the means for interconnecting the cable connectors must be rugged in construction to transmit stresses induced by such forces. Inasmuch as the active portion of the detector does not transmit any of these forces, it may be of much lighter material and is preferably of a density approximating the density of water so that it will move with particle movement of water or silt and will accurately record seismic waves.

Referring now in detail to the drawing, the signal generator indicated generally at 10 is mounted in the cavity of an annular case formed from two cup-like members 11 and 12 joined together at their open ends by sleeve 13. A pair of O-rings 14 and 15 arranged between sleeve 13 and case sections 11 and 12, respectively, provide a fluid-tight seal between the sleeve 13 and the two sections of the case. Each of the cup-like sections 11 and 12 have a centrally located hole 16 in its bottom through which electrical conductors 17 extend. The wall of hole 16 is rounded at its juncture with the outer face of the case as at 18 to avoid a sharp corner which might cause fatiguing and failure of wires 17 due to vibration of the case. A short section of resilient sheathing 19 is received within hole 16 and surrounds wires 17 to protect the wires.

Each cup-shaped section 11 and 12 of the case is provided with a pair of spaced annular grooves 20 about its outer periphery adjacent its closed end. Tubular boots 21 of resilient material are received about the closed ends of the cup sections 11 and 12 and are provided with ridge portions which extend into grooves 20. Annular straps 22 are positioned about the boot to approximately overlie grooves 20 and may be drawn tight with any conventional coupling means to hold the boot 21 in sealing engagement with the case. The material within grooves 20 will act as anchors to assist in holding the boots on the case and will also act in the manner of a lip-type seal to seal against flow of fluid between the boots and case.

Each boot has an annular dished in section 23 adjacent the case which will permit vibration of the case transversely to the central axis of the boots with least possible resistance by the boot 21. That is, the dished in portion 23 permits the boot to bend upon transverse reciprocation of the case with minimum stretching of the boot. The free end of the boot has a short cylindrical section 24 and an outturned flange 25 by which it is secured to the inactive portion of the detector as will appear more fully hereinafter.

Each of the case sections 11 and 12 is provided with an internal annular shoulder 26 spaced from and facing the open end of the cup section. Bearing holders 27 having a tight frictional fit with the inner wall of the cup section are received within the cavity in each section and abut shoulder 26. Bearing holders 27 transmit vibratory movement of the case to the generator and hence should reciprocate therewith without lost motion. Bearing holders 27 may be constructed of plastic to provide a lightweight structure. Centrally located within each bearing holder 27 is a ball bearing 28 for rotatably mounting the generator.

The generator is entirely contained within the cavity within the case provided by case sections 11 and 12, and may be of any desired form which will generate a signal in response to displacement, acceleration, or velocity of the case produced by seismic waves. Preferably, the generator is of the electromagnetic type employing a relatively movable coil and permanent magnet which function in the well known manner to induce a voltage in the coil upon movement of the magnet. The generator illustrated is mounted in a cup-shaped carrier 29. Carrier 29 has short hollow stub shafts 30 and 31 extending from opposite sides thereof and received within ball bearings 28 to mount carrier 29 for rotation within the case. It will be noted that shafts 30 and 31 are off-center, that is, positioned closely adjacent the upper edge of the cup-shaped carrier so that the center of gravity of the mass of the carrier and generator will be below the axis of rotation of carrier 29 to provide a gravity bias for the generator. This will provide a pendant type mounting with the generator free to rotate about an axis extending generally in the direction of the cable. The cable may rotate about its own axis and the pendant type mounting will insure proper orientation of the generator at all times. The hollow bores 32 and 33 in shafts 30 and 31 respectively communicate with upwardly extending holes 34 and 35 in carrier 29. An annular plug of insulating material 36 carrying a contact 37 is mounted within bore 32 of stub shaft 30 and a leaf spring contact 38 secured to bearing holder 27 bears upon the end of contact 37 to provide for rotating electrical contact between the leaf spring and contact 37. A like bushing 39, contact 40 and leaf spring 41 are carried by the shaft 31 and the bearing support 27 with which it is associated to provide a second rotatable contact. Contacts 37 and 40 are electrically connected to the generator as will appear below.

The bottom of generator holder 29 is provided with a central bore 42 and a counter bore 43. A tubular permanent magnet 44 has one end resting upon the shoulder between bores 42 and 43 and has a tight frictional contact with counter bore 43 to secure the magnet in holder 29. Generator holder 29 is preferably fabricated of a conducting material such as iron or steel to provide a flux path for the magnetic field of magnet 43. The inside of the cup-shaped carrier 29 may be hollowed out to a greater diameter than the diameter of lip 45 as at 46 so that substantially all of the magnetic flux will be concentrated in the air gap between the magnet 44 and lip 45. A coil of wire 47 is mounted upon a coil carrier 48 for vertical movement in the air gap between magnet 44 and lip 45, that is for movement relative to magnet 44. Coil 47 is suspended in the air gap between the magnet 44 and lip 45 by a pair of spaced leaf springs 49 and 50. Spring 49 is secured to the top of the generator carrier 29 by screw 51 and is spaced therefrom by an insulating block 52. Spring 49 is electrically insulated from screw 52. Spring 49 is secured to coil carrier 48 by screw 53. Spring 49 is also electrically insulated from screw 53 and coil carrier 48 by insulating washers 54 and 55. Spring 50 is secured to the bottom of the generator carrier 29 by a screw 55 with the spring electrically insulated from the screw and generator carrier. Spring 50 has its free end secured to a rod 56 which extends through the annular bore in magnetic member 44 and is secured to the coil carrier by screw 53.

Due to the pendant type mounting the spring 50 will always be on the bottom side of the generator and a generally upwardly travelling seismic wave vibrating the case will cause magnet 44 to vibrate therewith. This vibratory movement will cause vibration of the spring-mounted coil relative to magnet 44 in the usual manner to cut magnet lines of force in the air gap.

An electrical lead 57 is attached to one end of coil 47 and soldered to leaf spring 49. Current flows from the coil through lead 57 to leaf spring 49 which it will be recalled is insulated from the coil carrier and the generator carrier. An electrical lead 58 is secured to spring 49 and to contact 37 and thus current will flow from leaf spring 49 through wire 58, contact 37, leaf spring 38 and wire 59 to the recording instrument in the boat. A lead 60 is attached to the other end of the coil and to the coil carrier as at 61. Current flows through this lead to the coil carrier, through rod 56 to spring 50, which it will be recalled is electrically insulated from the generator carrier 29. A lead 62 extends between spring 50 and contact 40 and current will flow from the spring 50 through lead 62 to contact 40, thence through leaf spring 41 and wire 63 to the recording instrument in the boat. Thus, relative movement between the magnet 44 and coil 47 will induce a signal within coil 47 which will be transmitted to the recording instrument in the boat.

Wires 59 and 63, together with the other wires 17 which are connected to other detectors in the system, terminate in a socket generally indicated at 64 by which they are connected to the wires of the cable. The socket arrangement 64 is well known in the art and includes a plurality of male plugs 65 to which the several wires 17, 59 and 63 are respectively connected. The male plugs 65 are each carried in and extend through an annular disc 66. Female members 67 are carried by spaced annular discs 68 and 69 and receive the free end of the male plug 65 and provide electrical contact between the several wires of the cable and the wires 17 extending through the detector. Wires 17 terminate at their other ends in a like socket 64 which electrically connects the wires 17 with the several wires of the cable on the other side of the detector.

The detector is connected between two sections of seismic cable by cable connectors indicated generally at 70. Each cable connector includes a nipple 71 having a radially outwardly extending flange 72 intermediate its length. The nipple on one side of flange 72 has an external thread by which it is secured to the cable. On the other side of flange 72 the nipple has a plain outer periphery 73 which is received within cylindrical portion 24 of boot 21. An annular retainer ring 74 having an undercut portion 75 about its inner periphery which mates with the radially outwardly extending flange 25 of boot 21, abuts flange 72. The retainer ring 74 and flange 72 are provided with registering holes 76 and 77. A spacer sleeve 78 is positioned between the retainer ring 74 of each coupling and a bolt 79 extends through both flanges 72, retainer rings 74 and sleeve 78. A nut 80 is made up on the threaded end of bolt 79 to secure the two cable coupling members in spaced relationship and to sealingly secure the boot 21 to the cable coupling nipple. By reference to Fig. 3 it will be noted that a number of bolts 79 and spacer sleeves 78 are spaced about the annular flange 72 and in addition to holding the cable couplings in rigid spaced relationship to transmit the stress between the two sections of cable, these spacers act as a cage to protect the generator case against abrasion and damage as the cable is moved between shot locations. It will be noted that the cable couplings and cage parts 79 which form the cage about the generator case are of considerably heavier metal than are the two cup-shaped members which form the generator case. The cage and coupling parts are necessarily formed of heavier material to withstand towing of the cable which may be several thousand feet long. On the other hand, the generator case does not transmit any of the stress between the cable sections and, hence, need only be of sufficient strength to withstand the hydrostatic pressure to which it is subjected. This makes possible the construction of a generator and enclosing case which has a density approximating the density of water without ballooning the size of the generator case or coupling means.

Nipples 71 are secured in the conventional manner to a conventional section of seismic cable indicated generally at 81. Cable end 82 is provided with a radially outwardly extending flange 83. Flange 83 abuts the end of nipple 71 and a sleeve nut 84 having an internal annular shoulder 85 which abuts shoulder 83 is threadedly received by nipple 71 to hold fitting 82 in firm abutment with nipple 71. Fitting 82 has a reduced diameter portion 86 which is received within the bore of nipple 71 and a pair of O-rings 87 and 88 are carried in grooves about the periphery of reduced diameter portion 86 and seal between the cable coupling and end fitting 82.

A multi-strand steel cable of slightly smaller diameter than the bore through fitting 82 terminates in a rectangular end fitting 89 to which the cable is secured by a conventional Babbitt connection 90. End fittings 89 rests in a tapered bore 91 in end fitting 82. Bore 91 is frusto-conical in shape and end fitting 89 is an oblong rectangle thus leaving spaces on opposite sides of end fitting 89 through which wires 92 may pass. An annular bushing 93 is positioned between the steel cable 94 and end fitting 82 and has a plurality of axially extending holes 95 through which the several wires 92 extend. Bushing 93 prevents fatiguing and breaking of the wires at this point due to flexing the cable. The cable is covered with an exterior sheathing 96 which provides both electrical insulation and mechanical protection for the wires 92. Sheathing 96 is sealed to end fitting 82 by a pair of bands 97.

In assembling the device the generator would be made up by assembling its parts in the conventional manner within generator holder 29 and stub shaft 30 of holder 29 inserted into the left bearing support 27 as viewed in Fig. 2, the bearing support having previously been inserted into the cavity within casing section 11. Wires 59 and 63, together with the several wires 17, would be passed through the hole 18 in case section 11 and the threaded sleeve 13 made up on the case section 11. The other end of wires 17 would then be inserted through hole 16 of case section 12 in which a bearing support 27 had previously been positioned. The two halves of the case would then be brought together and shaft 31 inserted into the bearing 28 carried by case section 12 and the two sections of the case secured together by the sleeve 13. Thereafter the wires would be secured to the socket assemblies 64 at each end of the detector. Boots 21 would be positioned at each end of the case of the generator casing and secured to the cable coupling members using the flange retainers 74, spacers 73, bolts 79 and nuts 80 in the manner indicated in Fig. 2 to sealingly fasten boots 21 to the cable coupling members. It will be appreciated that wires 17 have a sufficient length dimension that the disc 66 of the sockets can be pulled out to the end of nipple 71 and engaged with the remainder of socket 64 to complete the electrical connection between wire 17 and the wires of the cable. Thereafter, sleeve nuts 84 may be threadedly engaged with nipple 71 to mechanically and sealingly secure the cable sections to the cable couplings. This arrangement permits ready replacement of a detector in the field.

With the detector thus assembled it will be appreciated that the generator casing may vibrate within the cage provided by the cable couplings and bolts 79 in response to seismic waves. The radial distance between the case and cage is not great but only a small clearance is required as useful seismic waves produce water particle motions which are a very small fraction of an inch.

As illustrated in Fig. 1, the detector will be made up between adjacent sections of a seismic cable and a large number of detectors will be made up in a single cable which will be towed by a recording boat indicated generally at 98. The cable will be towed between shot points and when an area is reached which it is desired to prospect the boat will be stopped allowing the cable to sink to the bottom. The weight of the cable and the heavy inactive portions of the detector will normally be sufficient to take the cable to the bottom and rest the detectors thereon. In the event of a silt-laden or soft bottom such as illustrated in Fig. 1, the cable will rest on the silt or perhaps be partially embedded therein. A shot is set off, usually from another vessel, and seismic waves will be reflected from earthen formations and travel upwardly to the seismic cable. The seismic waves will cause minute particle movement of the silt and the water which will be effective against the bottom of the generator case to vibrate the generator case and effect generation of an electric signal in response to such vibration. This current is conducted through the cable to the recording instrument within vessel 98. It will be appreciated that inasmuch as the generator case is movable relative to the remainder of the cable it may be constructed to have a density approximating the density of water and hence will give a true reading of the waves recorded even though the silt or water, as the case may be, might tend to flow around the cable connectors and cable. It will further be appreciated that as a practical matter it is not necessary to have the density of the generator case exactly the density of water. However, the closer the density of the case is to this value, the more reliable will be the reading obtained. By way of example, the heretofore employed case having a density of 6 or 8 times that of water has been used with some degree of success. A detector constructed in accordance with this invention which had a density of only half of that of the previously used detectors would be far superior to the prior art. However, it would not be as accurate as would a case having substantially the same density as water. With this in view the term "a density approximating the density of water" as used herein is intended to mean a density which is sufficiently close to the density of water to give a substantially correct reading but not necessarily the exact density of water.

While it is contemplated that this invention will find its widest practical use in oceanic operation the detector will also be useful in exploring lake bottoms and marshy areas where the problems are similar to those occurring on a silt-laden bottom.

It will also be appreciated that this detector is well adapted for taking recordings while suspended above the floor of the lake or ocean, as the case may be. Seismic waves pass through water without substantial distortion until they are very near to the surface of the water. Thus, the cable might be suspended a short distance under the surface of the water and seismic waves recorded in the manner hereinabove explained.

It will be appreciated that the cage might be covered in any desired manner by an abrasion boot to further protect the detector if the boot is provided with holes through which water will have free access to the exterior of the generator cage.

It will be further appreciated that the generator case might be constructed as a water-tight unit by providing a gland about wires 17 as they pass through holes 16 in the case.

From the foregoing it will be appreciated that the objects of this invention have been accomplished. There has been provided a signal generator whose density may approximate the density of water and hence water will not tend to flow around the generator case and an accurate reading of a seismic wave will be obtained. The detector combines the features of the type of detector which form a part of the cable with those of the detectors which are connected to the cable by resilient leads. The size of the detector has not been ballooned and will not interfere with storage of the cable on a reel. The signal generator case is contained within a cage which will protect it during towing of the cable.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A seismic detector comprising, a pair of spaced cable coupling members for connecting the detector between adjacent sections of a seismic cable to form a part thereof, means for interconnecting the cable coupling members and transmitting stress between the sections of cable to either side of the detector, a case mounted between the coupling members for movement relative to the coupling members, said case having a fluid-tight cavity therein, and means mounted in the cavity and wholly supported by the case for generating an electric signal in response to movement of the case by seismic waves.

2. A seismic detector comprising, a pair of spaced cable coupling members for connecting the detector between adjacent sections of a seismic cable to form a part thereof, means for interconnecting the cable coupling members and transmitting stress between the sections of cable to either side of the detector, a case mounted between the coupling members for movement relative to the coupling member, said case having a fluid-tight cavity therein, and means mounted in the cavity and wholly supported by the case for generating an electric signal in response to movement of the case by seismic waves, said case and contents thereof having a density approximating the density of water.

3. A seismic detector comprising, a pair of cable coupling members for connecting the detector between adjacent sections of a seismic cable to form a part thereof, means for rigidly interconnecting the coupling members in spaced relationship and forming therewith a cage, a case mounted in the cage for vibratory movement relative to the cage, said case having a fluid-tight cavity therein, and means mounted in the cavity and wholly supported by the case for generating an electric signal in response to vibration of the case by seismic waves.

4. A seismic detector comprising, a pair of cable coupling members for connecting the detector between adjacent sections of a seismic cable to form a part thereof, means for rigidly interconnecting the coupling members in spaced relationship and forming therewith a cage, a case mounted in the cage for vibratory movement relative to the cage, said case having a fluid-tight cavity therein, and means mounted in the cavity and wholly supported by the case for generating an electric signal in response to vibration of the case by seismic waves, said case and contents thereof having a density approximating the density of water.

5. A seismic detector comprising, a pair of cable coupling members for connecting the detector between adjacent sections of a seismic cable to form a part thereof, means for rigidly interconnecting the coupling members in spaced relationship and forming therewith a cage, a hollow case, means within and wholly supported by the case for generating an electric signal in response to vibration of the case by seismic waves, and resilient means carried by the coupling members mounting the case within the cage for vibration relative to the coupling members and sealing between the case and coupling members to prevent the entry of fluid into the hollow case.

6. A seismic detector comprising, a pair of cable coupling members for connecting the detector between adjacent sections of a seismic cable to form a part thereof, means for rigidly interconnecting the coupling members in spaced relationship and forming therewith a cage, a hollow case, means within and wholly supported by the case for generating an electric signal in response to vibration of the case by seismic waves, and resilient means carried by the coupling members mounting the case within the cage for vibration relative to the coupling members and sealing between the case and coupling members to prevent the entry of fluid into the hollow case, said case and contents thereof having a density approximating the density of water.

7. A seismic detector comprising, a pair of cable coupling members for sealingly connecting the detector between adjacent sections of seismic cable, said coupling members having outturned flanges concentric with the cable, a plurality of spacers extending between the flanges at circumferentially spaced points to form a cage concentric with and having a slightly greater radial dimension than the cable, a tubular case, means within the case for generating an electric signal in response to vibration of the case by seismic waves, and water impermeable resilient tubular boots sealingly carried by the coupling members and sealingly secured about the ends of the case to support the case within the cage for vibratory movement relative to the coupling members and seal the case against entry of fluid.

8. A seismic detector comprising, a pair of cable coupling members for sealingly connecting the detector between adjacent sections of seismic cable, said coupling members having outturned flanges concentric with the cable, a plurality of spacers extending between the flanges at circumferentially spaced points to form a cage concentric with and having a slightly greater radial dimension than the cable, a tubular case, means within the case for generating an electric signal in response to vibration of the case by seismic waves, and water impermeable resilient tubular boots sealingly carried by the coupling members and sealingly secured about the ends of the case to support the case within the cage for vibratory movement relative to the coupling members and seal the case against entry of fluid, said case and contents thereof having a density approximating the density of water.

9. A seismic detector comprising, a pair of cable coupling members for sealingly connecting the detector between adjacent sections of seismic cable, said coupling members having outturned flanges concentric with the cable, a plurality of spacers extending between the flanges at circumferentially spaced points to form an annular cage concentric with and of slightly greater diameter than the cable, an annular case, electromagnetic generator means within the case for generating an electric signal in response to vibration of the case by seismic waves, said means having a pendant off-center mounting about an axis extending in the direction of the cable so that the generator means will have a gravity bias and will always be properly orientated to generate a signal in response to a seismic wave, and water impermeable resilient annular boots sealingly carried by each coupling member and sealingly secured about the ends of the annular case to support the case within the cage for vibratory movement relative to the coupling members and seal the case against entry of fluid, said case and contents thereof having a density approximating the density of water.

10. A seismic detecting system comprising, a plurality of sections of seismic cable, and seismic detectors interconnecting each section of the cable with another section, said detectors forming a part of the completed cable and each comprising, a pair of spaced coupling members for connecting the detector between two sections of seismic cable to form a part thereof, means for interconnecting the cable coupling members and transmitting stress between the sections of cable to either side of the detector, a case mounted between the coupling members for vibratory movement relative to the coupling members, said case having a fluid-tight cavity therein, and means mounted in the cavity and wholly supported by the case for generating an electric signal in response to vibration of the case by seismic waves.

11. A seismic detecting system comprising, a plurality of sections of seismic cable, and seismic detectors interconnecting each section of the cable with another section, said detectors forming a part of the completed cable and each comprising, a pair of spaced coupling members for connecting the detector between two sections of seismic cable to form a part thereof, means for interconnecting the cable coupling members and transmitting stress between the sections of cable to either side of the detector, a case mounted between the coupling members for vibratory movement relative to the coupling members, said case having a fluid-tight cavity therein, and means mounted in the cavity and wholly supported by the case for generating an electric signal in response to vibration of the case by seismic waves, said case and contents thereof having a density approximating the density of water.

References Cited in the file of this patent

UNITED STATES PATENTS

| | | |
|---|---|---|
| 2,396,672 | Bancroft | Mar. 19, 1946 |
| 2,449,085 | Peterson | Sept. 14, 1948 |
| 2,582,994 | Kendall | Jan. 22, 1952 |
| 2,590,530 | Groenendyke | Mar. 25, 1952 |
| 2,592,780 | Woods | Apr. 15, 1952 |
| 2,638,176 | Doolittle | May 12, 1953 |
| 2,790,964 | Schurman | Apr. 30, 1957 |